United States Patent
Shao et al.

(10) Patent No.: US 11,162,728 B2
(45) Date of Patent: Nov. 2, 2021

(54) ICE MAKER AND REFRIGERATOR

(71) Applicants: HEFEI HUALING CO., LTD., Hefei (CN); HEFEI MIDEA REFRIGERATOR CO., LTD., Hefei (CN)

(72) Inventors: Yang Shao, Hefei (CN); Zengqiang Si, Hefei (CN); Zhengguang Lv, Hefei (CN); Jincai Wang, Hefei (CN); Guangqing Yang, Hefei (CN)

(73) Assignees: HEFEI HUALING CO., LTD., Hefei (CN); HEFEI MIDEA REFRIGERATOR CO., LTD., Hefei (CN)

( * ) Notice: Subject to any disclaimer, the term of this patent is extended or adjusted under 35 U.S.C. 154(b) by 171 days.

(21) Appl. No.: 16/485,418

(22) PCT Filed: May 24, 2017

(86) PCT No.: PCT/CN2017/085753
§ 371 (c)(1),
(2) Date: Aug. 12, 2019

(87) PCT Pub. No.: WO2018/145369
PCT Pub. Date: Aug. 16, 2018

(65) Prior Publication Data
US 2019/0390887 A1 Dec. 26, 2019

(30) Foreign Application Priority Data
Feb. 13, 2017 (CN) .......................... 201710076843.3

(51) Int. Cl.
*F25C 1/10* (2006.01)
*F25C 5/20* (2018.01)
(Continued)

(52) U.S. Cl.
CPC .................. *F25C 1/10* (2013.01); *F25C 1/24* (2013.01); *F25C 5/22* (2018.01); *F25D 23/12* (2013.01)

(58) Field of Classification Search
CPC ........ F25D 23/12; F25D 31/005; Y02P 60/85; F25C 1/10; F25C 1/24; F25C 2305/022; F25C 2400/10; F25C 5/08; F25C 5/22
See application file for complete search history.

(56) References Cited

U.S. PATENT DOCUMENTS 4,587,810 A * 5/1986 Fletcher .................. F25B 21/02
249/130
7,549,297 B2 6/2009 Martin et al.
(Continued)

FOREIGN PATENT DOCUMENTS

CN 2658668 Y 11/2004
CN 1782635 A 6/2006
(Continued)

OTHER PUBLICATIONS

Machine translation of CN 2658668 to Li et al. Nov. 24, 2004, eSpacenet, all of description (Year: 2004).*
(Continued)

*Primary Examiner* — Filip Zec
(74) *Attorney, Agent, or Firm* — Seed IP Law Group LLP

(57) ABSTRACT

The present disclosure provides an ice maker comprising: an ice tray, an ice making compartment and a heating compartment, wherein the ice tray can be switched between the ice making compartment and the heating compartment to realize ice making and heating for ice unloading, and there is no need to arrange a heater on the ice tray. The present disclosure also discloses a refrigerator, comprising a door body on which the ice maker as described above is disposed, wherein an ice outlet of the ice maker communicates with a distributor on the door body, thus facilitating ice taking (Continued)

without opening the door body. The present disclosure also discloses a refrigerator, comprising a refrigerating compartment in which the ice maker as described above is disposed, wherein the ice making compartment of the ice maker communicates with a freezer compartment or a cold air outlet of an evaporator.

17 Claims, 3 Drawing Sheets

(51) Int. Cl.
*F25C 1/24* (2018.01)
*F25D 23/12* (2006.01)

(56) References Cited

U.S. PATENT DOCUMENTS

| | | | | |
|---|---|---|---|---|
| 9,310,115 | B2* | 4/2016 | Boarman | F25C 1/24 |
| 9,759,472 | B2* | 9/2017 | Boarman | F25C 5/04 |
| 2005/0061016 | A1* | 3/2005 | Lee | F25C 5/046 |
| | | | | 62/340 |
| 2009/0308085 | A1* | 12/2009 | DeVos | F25C 5/08 |
| | | | | 62/73 |
| 2012/0240613 | A1* | 9/2012 | Saito | F25C 5/187 |
| | | | | 62/344 |
| 2017/0299244 | A1* | 10/2017 | Alshourbagy | F25C 5/22 |
| 2018/0187941 | A1* | 7/2018 | An | F25C 5/08 |

FOREIGN PATENT DOCUMENTS

| | | |
|---|---|---|
| CN | 101074822 A | 11/2007 |
| CN | 104949418 A | 9/2015 |
| JP | 2002-98453 A | 4/2002 |

OTHER PUBLICATIONS

International Search Report, dated Nov. 10, 2017, for International Application No. PCT/CN2017/085753, 2 pages.

* cited by examiner

ICE MAKER AND REFRIGERATOR

CROSS-REFERENCE TO RELATED APPLICATION

This application claims priority to Chinese patent application No. 201710076843.3 filed on Feb. 13, 2017, entitled "Ice Maker and Refrigerator," which is incorporated herein by reference in its entirety.

BACKGROUND

Technical Field

The present disclosure relates to the technical field of ice making in refrigerator, and in particular, to an ice maker and a refrigerator.

Description of the Related Art

Two main ice unloading methods exist in existing refrigerators: one is to unload ice by twisting an ice tray and the other is to unload ice by heating through heaters disposed at the ice tray. The former has specific requirements for the material of the ice tray, resulting in that the ice tray has the defects of low heat transfer efficiency, lower ice making and ice unloading speed, which affects the ice making speed. The latter requires heaters disposed at the ice tray, which will hinder the cold air close to the ice tray and affect the ice making efficiency. At the same time, the local heating of the ice tray can be only achieved through the heaters, resulting in uneven heating and low ice unloading speed; and it will affect the heat transfer efficiency of the ice tray, and the ice making efficiency is low if the heaters are evenly distributed within the ice tray and the surface of the ice tray.

BRIEF SUMMARY

Technical Problems to be Solved

The technical problems to be solved by the present disclosure are limitation of ice making or ice unloading speed due to the ice unloading method of the existing ice maker and low ice making efficiency.

Technical Solutions

In order to solve the technical problem above, the present disclosure provides an ice maker comprising: an ice tray, an ice making compartment and a heating compartment, wherein the ice tray can be switched between the ice making compartment and the heating compartment to realize ice making and ice unloading.

In an embodiment of the present disclosure, the heating compartment and the ice making compartment are isolated by a partition plate, the partition plate is provided with a passage through which the ice tray passes and at which a sealing unit is disposed between the ice tray and the partition plate to maintain that the heating compartment and the ice making compartment are isolated from each other.

In an embodiment of the present disclosure, the passage has a blocking unit which can be opened and closed and be used for isolating the ice tray and the heating compartment while the ice tray moves into the ice making compartment.

In an embodiment of the present disclosure, the ice tray is mounted inside the passage through a rotating unit.

In an embodiment of the present disclosure, the ice tray has a semicircular cross section, and the rotation axis of the rotating unit coincides with a center line of the semicircular ice tray.

In an embodiment of the present disclosure, the wall surfaces of the ice making compartment each is provided with a heat insulating layer or is made of a heat insulating material.

In an embodiment of the present disclosure, the wall surfaces of the ice making compartment and the heating compartment each is provided with a heat insulating layer or is made of a heat insulating material.

In an embodiment of the present disclosure, a fan is disposed inside the heating compartment.

In an embodiment of the present disclosure, the heating compartment is located above the ice making compartment.

The present disclosure also discloses a refrigerator, comprising a door body, on which the ice maker as described above is disposed, wherein an ice outlet is disposed at the ice making compartment of the ice maker and communicates with a distributor on the door body.

In an embodiment of the present disclosure, an ice pushing unit is disposed at the bottom of the ice making compartment.

The present disclosure also discloses a refrigerator, comprising a refrigerating compartment in which the ice maker as described above is disposed and a freezer compartment, wherein the ice making compartment of the ice maker communicates with the freezer compartment or a cold air outlet of an evaporator through a pipeline.

Beneficial Effects

By the technical solution above, the following advantages are achieved: according to the ice maker of the present disclosure, by disposing the heating compartment and the ice making compartment and arranging the ice tray into a structure which can be switched inside the heating compartment and the ice making compartment, there is no need to arrange a heater on the ice tray under the premise of ensuring the ice making, heating and ice unloading, and thus better heat exchange effect and high ice making and ice unloading efficiency are achieved; and further, less energy is used during the ice unloading and it is more energy-saving without affecting the efficiency of ice making.

Since the refrigerator provided by the present disclosure comprises the ice maker as described above and disposed on a door body of the refrigerator, and an ice outlet of the ice maker communicates with a distributor on the door body, it is convenient to take the ice cube in the case that the door body is not opened.

Since the refrigerator provided by the present disclosure comprises the ice maker as described above and disposed inside the refrigerating compartment, and the ice making compartment communicates with the freezer compartment, the ice making compartment and the freezer compartment are kept in communication at all times through this structure and opening and closing the door body does not affect the ice making, and thus high ice making efficiency is achieved.

DESCRIPTION OF THE REFERENCE NUMBERS

Figure 1:
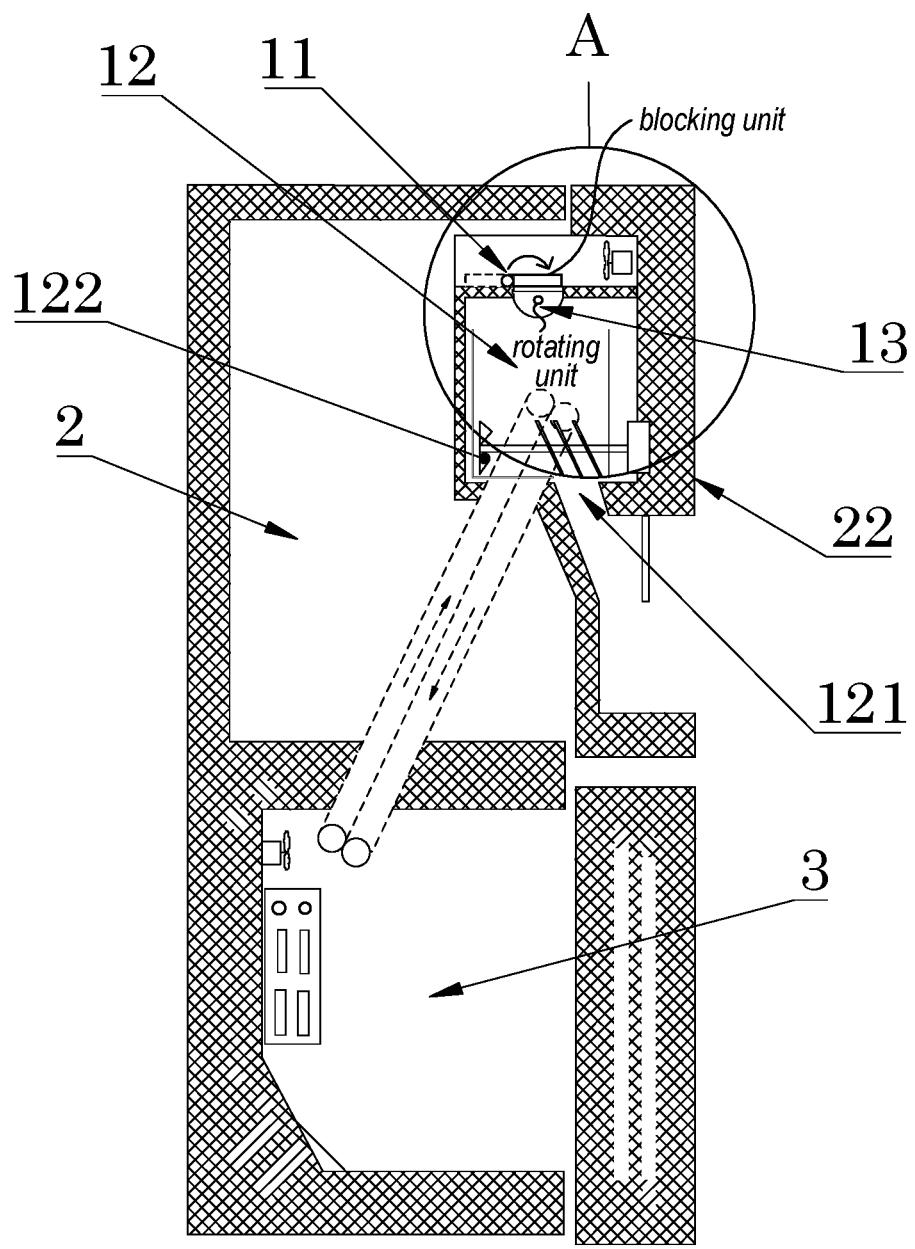
FIG. 1 is a schematic structural view of a refrigerator according to Embodiment 2 of the present disclosure.

| | |
|---|---|
| 11 heating compartment; | 111 fan; |
| 12 ice making compartment; | 121 ice outlet; |
| 122 ice pushing unit; | 13 ice tray; |
| 14 ice cube; | 2 refrigerating compartment; |
| 21 partition plate; | 211 sealing unit; |
| 22 door body; | 3 freezer compartment |

DETAILED DESCRIPTION

The specific implementations of the present disclosure are further described in detail below with reference to the drawings and embodiments. The following examples are intended to illustrate the disclosure but are not intended to limit the scope of the disclosure.

In the description of the present disclosure, it is to be noted that unless otherwise stated, the scope of "above" includes the number itself, and the meaning of "plurality" is two or more; the orientation or positional relations specified by terms such as "upper," "lower," "left," "right," "inside," "outside," "front end," "back end," "head," "tail," etc., are based on the orientation or positional relations shown in the drawings, which is merely for convenience of description of the present disclosure and simplified description, and does not indicate or imply that the stated device or element must have the particular orientation and constructs and operates in a particular orientation, and thus it is not to be construed as limiting the disclosure. Furthermore, the terms "first," "second," "third" and the like are used for descriptive purposes only and are not to be construed as indicating or implying a relative importance.

In the description of the present disclosure, it is to be noted that unless explicitly stated and defined otherwise, the terms "installed," "connected with," and "connected" shall be understood broadly, for example, it may be either fixedly connected or detachably connected, or can be integrated; it may be mechanically connected, or electrically connected; it may be directly connected, or indirectly connected through an intermediate medium. The specific meanings of the terms above in the present disclosure can be understood by a person skilled in the art in accordance with specific conditions.

Embodiment 1

Figure 2:
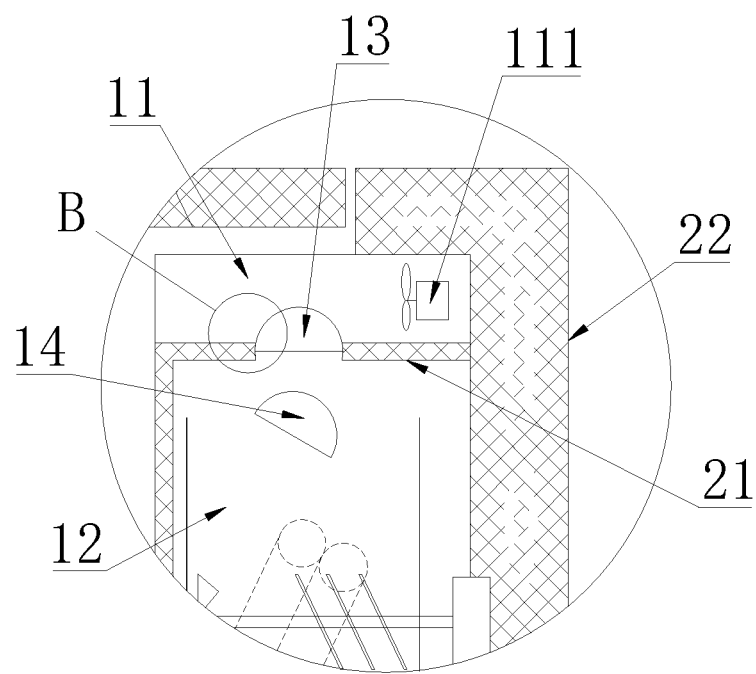
FIG. 2 is a partial enlarged view of A in FIG. 1.

Referring to FIG. 2, the present disclosure provides an ice maker comprising: an ice tray 13, an ice making compartment 12 and a heating compartment 11, wherein the ice tray 13 can be switched between the ice making compartment 12 and the heating compartment 11 to realize ice making and ice unloading. By switching the position of the ice tray 13, the ice tray 13 can be directly placed in the ice making compartment 12 or the heating compartment 11, and the ice tray 13 absorbs cooling energy in the ice making compartment 12 to realize the ice making, and then is switched into the heating compartment 11 for absorbing heating energy to realize the ice unloading. The ice tray 13 is heated by the gas above zero degrees in the heating compartment 11, and no heater is required on the ice tray 13, and thus the ice tray 13 can be made as thin as possible to facilitate fast transfer of cooling or heating energy and achieve high ice making and ice unloading speed and high ice making efficiency.

Figure 3:
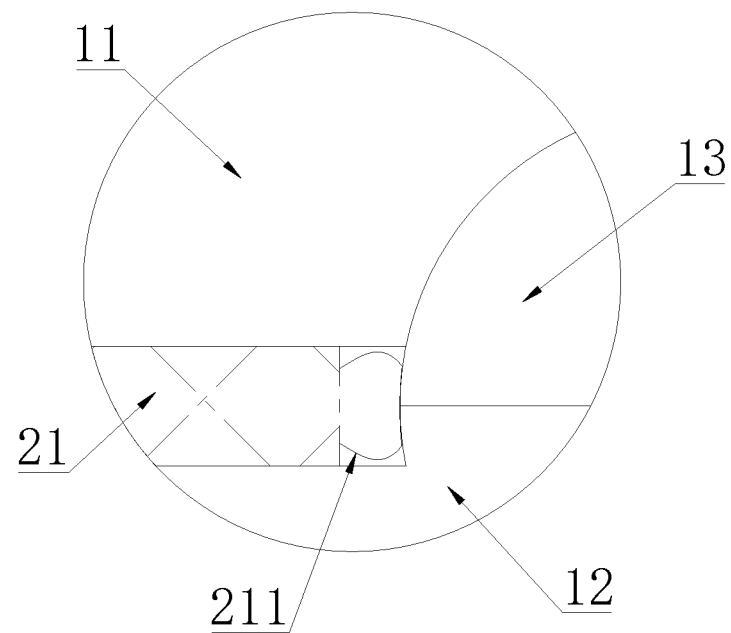
FIG. 3 is a partial enlarged view of B in FIG. 2.

Specifically, as shown in FIG. 3, the heating compartment 11 and the ice making compartment 12 are isolated by a partition plate 21, the partition plate 21 is provided with a passage through which the ice tray 13 passes and at which a sealing unit 211 is disposed between the ice tray 13 and the partition plate 21 to maintain that the heating compartment 11 and the ice making compartment 12 are isolated from each other. Since the ice tray 13 needs to pass through the passage to be switched between the heating compartment 11 and the ice making compartment 12, while the heating compartment 11 and the ice making compartment 12 will form air exchange at the passage, in order to avoid this phenomenon, the sealing unit 211 is disposed between the ice tray 13 and the partition plate 12 to achieve the isolation between the two compartments and reduce the air exchange; for example, a sealing ring is provided on both sides of the ice tray 13, and the isolation can be achieved at least when the ice tray 13 is in a fixed state.

Further, the passage has a blocking unit which can be opened and closed and be used for isolating the ice tray 13 and the heating compartment 11 while the ice tray 13 moves into the ice making compartment 12. No shown in the drawings, during the ice making, the ice tray 13 needs to absorb cooling energy. If the passage is not blocked, the hot air in the heating compartment 11 can still be in contact with the ice tray 13, resulting in waste of the cooling energy and affecting the ice making efficiency; therefore, the blocking unit disposed at the passage is closed when the ice tray 13 is in the ice making compartment 12, and the ice tray 13 is blocked in the ice making compartment 12 to isolate the ice tray 13 from the heating compartment 11 to prevent the ice tray 13 from absorbing heating energy during ice making and thus the ice making efficiency is improved. When it is necessary to move the ice tray 13, the blocking unit is opened to facilitate the passing of the ice tray 13. When ice tray 13 is located in the heating compartment 11, the blocking unit is closed if it can be closed, and the isolation effect between the heating compartment 11 and the ice making compartment 12 is maintained by the sealing unit 211 if the blocking unit cannot be closed.

Specifically, the ice tray 13 is installed inside the passage by a rotating unit. That is, switching the ice tray 13 between the heating compartment 11 and the ice making compartment 12 can be achieved by driving the ice tray 13 to rotate through the rotating unit. For example, the ice tray 13 is driven to rotate through a motor drive shaft, the ice tray 13 absorbs heating energy to unload ice when it rotates into the heating compartment 11 and it absorbs cooling energy to make ice when it rotates into the ice-making compartment 12. It is flexible and controllable to switch the position of the ice tray 13 and it is simple in structure and low in the manufacturing cost. For this configuration, the partition plate 21 should be made as thin as possible, or the partition 21 should be thinner at the passage to increase the heat exchange area of the ice tray 13 in the ice making compartment 12 or the heating compartment 11.

Preferably, as shown in FIGS. 2 and 3, the ice tray 13 has a semicircular cross section, and the rotation axis of the rotating unit coincides with the center line of the semicircular ice tray 13. That is, looking from the direction of the rotation center of the vertical ice tray 13, the ice tray 13 has a semi-circular cross section, and the ice tray 13 may be a hemispherical structure as a whole or a semi-circular groove; this structure allows the gap between the ice tray 13 and the passage to be uniform to facilitate the arrangement of the sealing unit 211 and ensure the isolation effect.

Preferably, the wall surfaces of the ice making compartment 12 each is provided with a heat insulating layer or is made of a heat insulating material. That is, the wall surfaces surrounding to form the ice making compartment 12 each is provided with a heat insulating layer or is made of a heat insulating material so as to ensure the heat insulating effect of the ice making compartment 12 with the outside, reduce the loss of the cooling energy; and thus the influence of the entire ice maker on the surrounding environments is decreased.

Preferably, the wall surfaces of the ice making compartment 12 and the heating compartment 11 each is provided with a heat insulating layer or is made of a heat insulating material. That is, the wall surfaces surrounding to form the ice making compartment 12 and the heating compartment 11 each is provided with a heat insulating layer or is made of a heat insulating material so as to ensure the heat insulating effect of the ice making compartment 12 with the outside, reduce the loss of both the cooling energy in the ice making compartment 12 and heating energy in the heating compartment 11; and thus the influence of the entire ice maker on the surrounding environments is decreased.

Further, a fan 111 is disposed inside the heating compartment 11. By the arrangement of the fan 111, the flow rate of air inside the heating compartment 11 can be increased and the heat exchange efficiency is enhanced; at the same time, the arrangement of the fan 111 makes the direction of the air flow blown toward the ice tray 13 can be controllable, hot air is uniformly blown toward the surface of the ice tray 13, thereby improving the heat exchange efficiency. At the same time, the ice tray 13 is heated more evenly everywhere, avoiding excessive melting of the ice cube 14 due to partial concentrated heating of the ice cube 14, thereby ensuring the ice making amount.

Preferably, the heating compartment 11 is located above the ice making compartment 12, and the ice cubes 14 made are stored in the ice making compartment 12. The ice making compartment 12 also serves as an ice storage box, or an ice storage box is added in the ice making compartment 12. After the ice tray 13 is heated in the heating compartment 11, the ice cubes 14 can be directly dropped into the ice making compartment 12 for storage; a water inlet is disposed in the heating compartment 11 and no clogging occurs since it is in environment where the temperature is above zero. Therefore, it is not necessary to dispose a heating module at the water inlet, which reduces the manufacturing cost and ensures the smooth operating of the ice making process.

In the ice unloading process of this embodiment, the energy consumed is only that used during the motor drives the ice tray 13 to rotate and that for the operation of the fan 111, which is much less than that consumed by heating the ice tray in the prior art; and thus less energy is used in the process of ice unloading, which is more energy-efficient without affecting the ice making efficiency.

Embodiment 2

As shown in FIG. 1 to FIG. 3, the present embodiment provides a refrigerator comprising a door body 22 on which the ice maker as described in Embodiment 1 is provided, and an ice outlet 121 is disposed at the ice making compartment 12 of the ice maker and communicates with a distributor on the door body 22. That is, the ice maker as described in Embodiment 1 is integrally disposed on the door body 22 of the refrigerator, in order to ensure the aesthetic appearance, the ice maker is generally installed inside the door body 22, and the ice outlet 121 of the ice making compartment 12 communicates with the dispenser on the door body 22 so that the user can take the ice cube 14 without opening the door body 22. Whether the ice maker is installed on the door of the freezer compartment 3 or the door of the refrigerating compartment 2, the ice making compartment 12 communicates with the freezer compartment 3 or communicates with an evaporator in the freezer compartment 3 through a pipeline to achieve the purpose of introducing and leading out of cold air. Cold air can be introduced into and led from the ice making compartment 12 by a port thereof disposed at the interface with the liner of the refrigerator, and the cold air passage is turned off/on after the door body 22 is opened/closed. Since the entire ice maker is a closed architecture, the temperature and storage effect of the refrigerating compartment of the refrigerator compartments do not be affected while achieving a certain sound insulation effect and improving the user experience.

When an ice storage box is provided in the ice making compartment 12, an ice outlet 121 corresponding thereto should be disposed at the bottom of the ice storage box. The presence of the ice storage box can facilitate the passing of cold air, and the cold air can directly exchange heat with the ice tray 13 without passing through the ice cube 14, thereby ensuring the ice making effect; by the arrangement of the ice storage box, the blocking can be achieved, the contact area between cold air and the ice cubes 14 is decreased, the possibility of bonding of the ice cubes 14 is reduced, and the user experience is improved.

Further, an ice pushing unit 122 is disposed at the bottom of the ice making compartment 12. The ice pushing unit 122 is arranged to push the ice cubes 14 toward the ice outlet 121 to achieve batch ice taking. Of course, if necessary, an ice crushing unit may be added or the ice pushing unit 122 may be replaced with an ice crushing unit.

Embodiment 3

Figure 4:
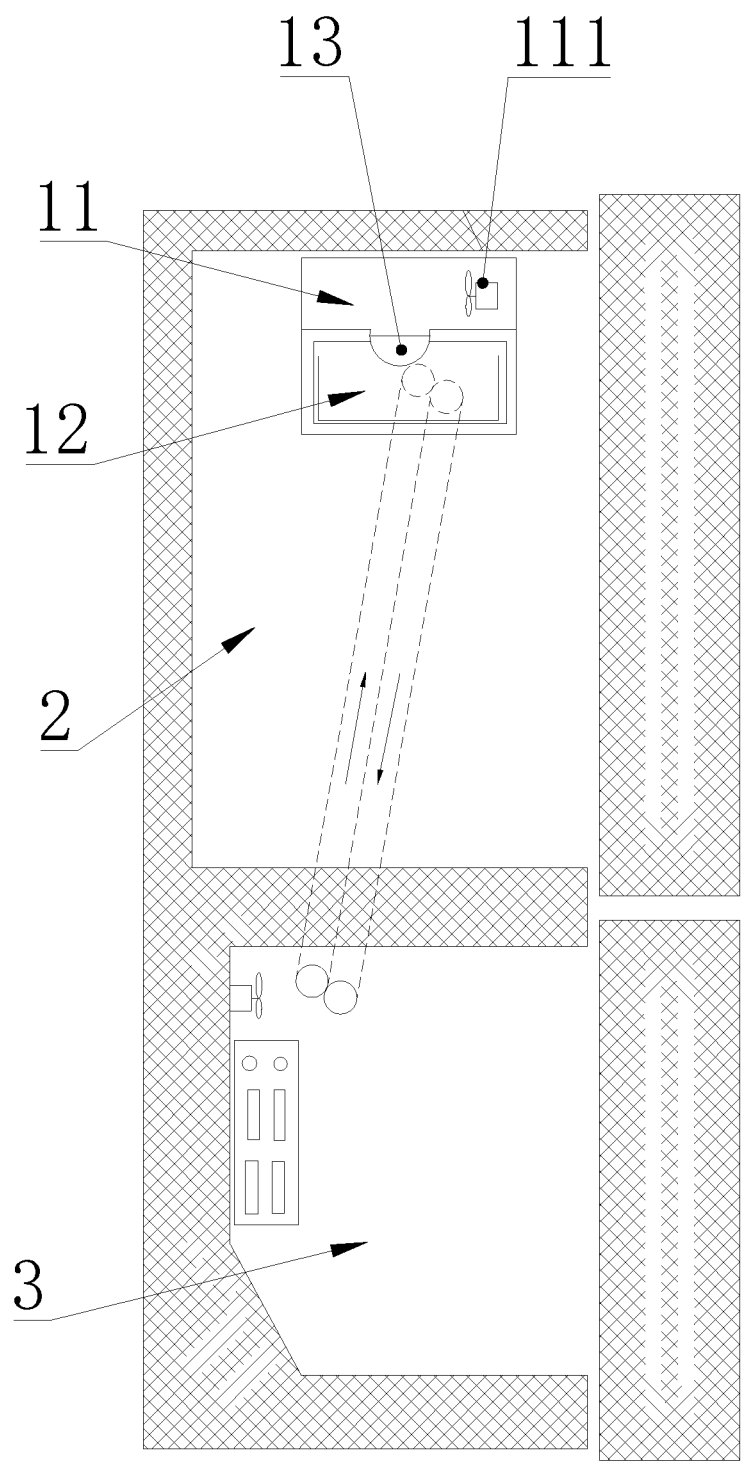
FIG. 4 is a schematic structural view of a refrigerator according to Embodiment 3 of the present disclosure.

As shown in FIG. 4, the present embodiment provides a refrigerator comprising a refrigerating compartment 2 in which an ice maker according to Embodiment 1 is provided and a freezer compartment 3. The ice making compartment 12 of the ice maker communicates with the freezer compartment 3 or a cold air outlet of an evaporator through a pipeline. That is, the ice maker is disposed in the refrigerating compartment 2, the ice making compartment 12 is always in a state of being communicated with the freezer compartment 3 or the cold air outlet of the evaporator through the pipeline, and thus the opening and closing of the door does not affect the ice making process. In this configuration, the ice making compartment 12 should be set to be openable for the user to take ice cubes.

The above are only preferred implementations of the present disclosure, and it should be noted that several improvements and substitutions can be made by a person skilled in the art without departing from the technical principles of the present disclosure. These improvements and substitutions should also be considered as the scope of protection of the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An ice maker, comprising:
an ice tray;
an ice making compartment; and
a heating compartment;
wherein the ice tray is structured to switch between two states of being coupled to the ice making compartment to realize ice making or being coupled to the heating compartment to realize ice unloading, and
wherein the heating compartment and the ice making compartment are isolated from each other by a partition plate, the partition plate including:
a passage through which the ice tray passes, and
a sealing ring disposed at the passage between the ice tray and the partition plate to maintain that the heating compartment and the ice making compartment are isolated from each other.

2. The ice maker of claim 1, wherein the passage has a blocking unit which can be opened and closed and be used for isolating the ice tray and the heating compartment while the ice tray is coupled to the ice making compartment.

3. The ice maker of claim 2, wherein the ice tray is mounted inside the passage through a rotating unit.

4. The ice maker of claim 3, wherein the ice tray has a semicircular cross section, and wherein a rotation axis of the rotating unit aligns with a center line of the semicircular ice tray.

5. The ice maker of claim 1, wherein wall surfaces of the ice making compartment is provided with a heat insulating layer or is made of a heat insulating material.

6. The ice maker of claim 1, wherein wall surfaces of the ice making compartment and wall surfaces of the heating compartment is provided with a heat insulating layer or is made of a heat insulating material.

7. The ice maker of claim 1, further comprising a fan disposed inside the heating compartment.

8. The ice maker of claim 1, wherein the heating compartment is located above the ice making compartment.

9. A refrigerator, comprising:
a door body;
an ice distributor disposed on the door body; and
an ice maker disposed on the door body and having an ice outlet communicating with the ice distributor;
wherein the ice maker includes:
an ice making compartment,
a heating compartment, and
an ice tray that is structured to switch between two states of being located within the ice making compartment or being located within the heating compartment, and
wherein the heating compartment and the ice making compartment are isolated from one another by a partition plate, the partition plate including:
an opening, and
a sealing member coupled to the opening and defining a passage that the ice tray passes through.

10. The refrigerator of claim 9, wherein the partition plate includes a blocking unit structured to open or close the passage.

11. The refrigerator of claim 10, wherein the ice tray is coupled to the partition plate through a rotating unit.

12. The refrigerator of claim 11, wherein the ice tray has a semicircular cross section, and wherein a rotation axis of the rotating unit aligns with a center line of the semicircular ice tray.

13. The refrigerator of claim 9, wherein the ice making compartment and the heating compartment are positioned vertically adjacent to one another.

14. The refrigerator of claim 13, wherein the heating compartment is located above the ice making compartment.

15. A refrigerator, comprising:
a main body having a refrigerating compartment and a freezer compartment;
one or more door bodies coupled to the main body; and
an ice maker disposed in the refrigerating compartment;
wherein the ice maker includes:
an ice making compartment that communicates with the freezer compartment through a pipeline,
a heating compartment, and
an ice tray configured to move between two positions of being within the ice making compartment or being within the heating compartment,
wherein the heating compartment and the ice making compartment are isolated from one another by a partition plate, the partition plate including:
an aperture, and
a sealing member coupled to the aperture and defining an opening that enables the ice tray to pass through.

16. The refrigerator of claim 15, wherein the partition plate includes a blocking unit configured to open or block the opening.

17. The refrigerator of claim 15, wherein a wall body of the ice making compartment includes at least one of a heat insulating layer or a heat insulating material.

* * * * *